(12) United States Patent
Tello et al.

(10) Patent No.: US 7,885,142 B2
(45) Date of Patent: Feb. 8, 2011

(54) METHOD AND APPARATUS FOR LOGGING FOAM CEMENT IN CASED BOREHOLES

(75) Inventors: Lucio N. Tello, Benbrook, TX (US); Sarah D. Molder, Benbrook, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 660 days.

(21) Appl. No.: 11/866,221

(22) Filed: Oct. 2, 2007

(65) Prior Publication Data

US 2009/0086575 A1  Apr. 2, 2009

(51) Int. Cl.
*G01V 1/00*  (2006.01)
(52) U.S. Cl. .............................. 367/35; 367/69; 181/105
(58) Field of Classification Search .................. 367/35, 367/69; 181/105
See application file for complete search history.

(56) References Cited

U.S. PATENT DOCUMENTS

| 4,928,269 A * | 5/1990 | Kimball et al. ............... 367/35 |
| 5,491,668 A * | 2/1996 | Priest .......................... 367/35 |
| 2008/0112262 A1 * | 5/2008 | Tang et al. .................... 367/35 |

OTHER PUBLICATIONS

Goodwin, K.J., "Guidelines for Ultrasonic Cement-Sheath Evaluation" SPE Production Engineering, Aug. 1992, pp. 280-284.

Graham, W.L., "Enhanced Statistical Variation Method for Determining Zone Isolation in Complex Cements" SPE-28772, Nov. 1994.

Butsch, R.J., "Overcoming Interpretation Problems of Gas-Contaminated Cement Using Ultrasonic Cement Logs" SPE-30509, Oct. 1995.

Harness, P.E., "Neutron Logs Improve Interpretation of Foamed Cements, Evin in Concentric Casing" SPE-35681, May 1996.

Frish, Gary J., "Assessment of Foamed-Cement Slurries Using Conventional Cement Evaluation Logs and Improved Interpretation Methods" SPE-55649, May 1999.

* cited by examiner

*Primary Examiner*—Mark Hellner
(74) *Attorney, Agent, or Firm*—Wong, Cabello, Lutsch, Rutherford & Brucculeri, L.L.P.

(57) ABSTRACT

An acoustic logging system that measures distribution of foam cement and other material in a casing-borehole annulus. The distribution is preferably displayed as map. A borehole tool utilizes at least one acoustic transducer with a known frequency response and mounted on a rotating scanning head that is pointed essentially perpendicular to the borehole wall. The response of the transducer is used to measure an original impedance map of material within the borehole-casing annulus. A fast Fourier transform is used to generate a FFT map from the data comprising the original impedance map. The original impedance map is then combined with the FFT map using logic rules to obtain a final impedance map that is indicative of material within the casing-borehole annulus.

15 Claims, 4 Drawing Sheets

METHOD AND APPARATUS FOR LOGGING FOAM CEMENT IN CASED BOREHOLES

This invention is directed toward a borehole logging system for the measure of properties and conditions of a well borehole environs. More particularly, the invention is directed toward an acoustic logging system for identifying and mapping distribution of material filling an annulus formed by the outside surface of the tubular and the wall of the borehole. This material includes foam cement as well as conventional cement and liquids.

BACKGROUND OF THE INVENTION

Well boreholes are typically drilled in earth formations to produce fluids from one or more of the penetrated formations. The fluids include water, and hydrocarbons such as oil and gas. Well boreholes are also drilled in earth formations to dispose waste fluids in selected formations penetrated by the borehole.

The boreholes are typically lined with tubulars commonly referred to as casing. Casing is typically steel, although other metals and composites such as fiberglass can be used. The outer surface of the casing and the borehole wall form an annulus, which initially contains formation or drilling liquids. These liquids within the casing-borehole annulus are typically displaced with a grouting material such as cement. The casing and grouting material forming a casing-borehole sheath perform several functions. One function is to provide mechanical support for the borehole and thereby prevent the borehole from collapsing. Another function is to provide hydraulic isolation between formations penetrated by the borehole. The casing can also be used for other functions such as means for conveying borehole valves, packers, pumps, monitoring equipment and the like.

The casing-borehole annulus has traditionally been filed with heavy slurry cements. These cement slurries are pumped down the casing, flow upward into the casing-borehole annulus, and subsequently hardened or "set" thereby providing the desired formation support and isolation. In recent years, lighter weight foam cements have been used to cement casing. These light weight cements provide functions of the regular cement with the advantage of not invading the oil and gas producing soft formations Foam cements typically contain glass beads, ceramic spheres filled with air, or nitrogen bubbles. If the grouting material such as conventional or foam cement does not fill the casing-borehole annulus or is not properly bonded to the casing, hydraulic isolation is compromised. Cement evaluation systems use downhole "tools" typically measure acoustic impedance and other parameters associated with the borehole environs. Foam cement and well fluids typically have similar acoustic impedances. Distinguishing foam cement from liquid or gas well fluid is difficult using only acoustic impedance measurements from cement evaluation tools, including ultrasonic radial scanning type tools. This lack of impedance contrast often results in an indication of voids within a foam cement sheath behind casing, or that casing is "free" when it may be well bonded to foam cement.

In view of the brief discussion above, it is apparent that a measure of cement distribution behind the casing can be important from economic, operation and safety aspects. A direct measure of acoustic impedance can be used to determine the distribution of some types of grouting material in the casing-borehole annulus. Apparatus and methods for measuring acoustic impedance behind casing are disclosed in U.S. Patent Application Publication No. US 2006/0067162 A1, which is herein entered into this disclosure by reference. The difference between the acoustic impedance of convention cement and typical borehole fluids is significant. An azimuthal measure of impedance of the acoustic material in the casing-borehole annulus can therefore be used to "map" the distribution of conventional cement behind casing. Foam cement has a lower density than conventional cement and, consequently, has a lower the acoustic impedance. More specifically, the acoustic impedance of foam cement is essentially the same as typical drilling and formation fluids found in the casing-borehole annulus prior to cementing. A simple map of the acoustic impedance of material in the casing-borehole annulus can not, therefore, be used to map a distribution of foam cement behind casing.

SUMMARY OF THE INVENTION

This present invention is an acoustic logging system that measures distribution of foam cement and other material in a casing-borehole annulus. Cement distribution is preferably displayed as two dimensional images or "maps". The map preferably encompasses a full 360 degree azimuthal sweep of the borehole, and is displayed as a function of depth within the borehole thereby forming a two dimensional "log" of each parameter. Pixels forming the map are measures of material within the casing-borehole annulus with one dimension being a borehole azimuthal arc segment and the second dimension being a borehole depth interval. Alternately, foam cement distribution can be represented by a plurality of "traces" where each trace represents an azimuthal arc segment of the borehole.

The borehole assembly or borehole "tool" of the system utilizes at least one acoustic transducer with a known frequency response and mounted on a rotating scanning head that is pointed essentially perpendicular to the borehole wall. The transducer generates a sequence of preferably ultrasonic acoustic energy bursts as the scanning head is rotated. A response signal, resulting from each energy bursts interacting with borehole environs, is measured and recorded. These response signals and the responses of a reference transducer system are then analyzed and combined, using predetermined relationships, to determine distribution of foam cement and other material within the casing-borehole annulus. The borehole tool will be subsequently referred to as the "ultrasonic scanning tool" and the system as a whole will be referred to as the "ultrasonic cement scanner" logging system.

It is known that the acoustic impedance varies as function of depth more dramatically in the presence of foam cement than in the presence of fluids or homogeneous cement slurries. The ultrasonic scanning tool measures acoustic impedance as a function of depth in a well borehole. The invention further comprises a fast Fourier transform (FFT) algorithm, using the depth as a variable, which measures changes in impedance, both in magnitude and frequency. Results of the FFT are then used to distinguish foam cement from conventional cement or from well fluids (such as liquids or gas) as a function of depth.

Data processing includes the construction of a first map comprising measured impedance around a 360 degree sweep of the borehole as a function of depth. This first map distinguishes between high impedance conventional cement and well fluids such as formation and drilling fluids. A second map is constructed using results of the FFT as a function of depth. This second map includes variations that distinguish between the borehole fluids and foam cement. A third map is constructed by combining the first map and the second map using logic rules comprising ranges, thresholds and values.

This third map identifies and distinguishes between the presence of high impedance cement, foam cement, and well fluids.

Mathematical computations can optionally be performed in a processor within the ultrasonic scanning tool and telemetered to the surface thereby minimizing telemetry band width requirements.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

FIG. 4b is a corresponding final acoustic impedance map obtained by logically combining a FFT map with the acoustic impedance map shown in FIG. 4a;

FIG. 6b is a FFT map corresponding to the impedance map of FIG. 6a; and

DETAILED DESCRIPTION OF THE PREFERRED EMBODIMENTS

This present invention utilizes an Ultrasonic Cement Scanner logging system to measure distribution of foam cement, well fluid and/or conventional cement within a casing-borehole annulus. Distribution is preferably displayed as two dimensional images or "maps". Distribution can be alternately be displayed as traces representing an azimuthal arc segment. The map image preferably encompasses a full 360 degree azimuthal sweep of the borehole, and is displayed as a function of depth within the borehole. Alternately, partial azimuthal map images can be generated. The desired parameters of interest, namely the distribution of foam cement, well fluid and/or conventional cement, are obtained from processed measures of acoustic impedance.

Overview of the System

Figure 1:
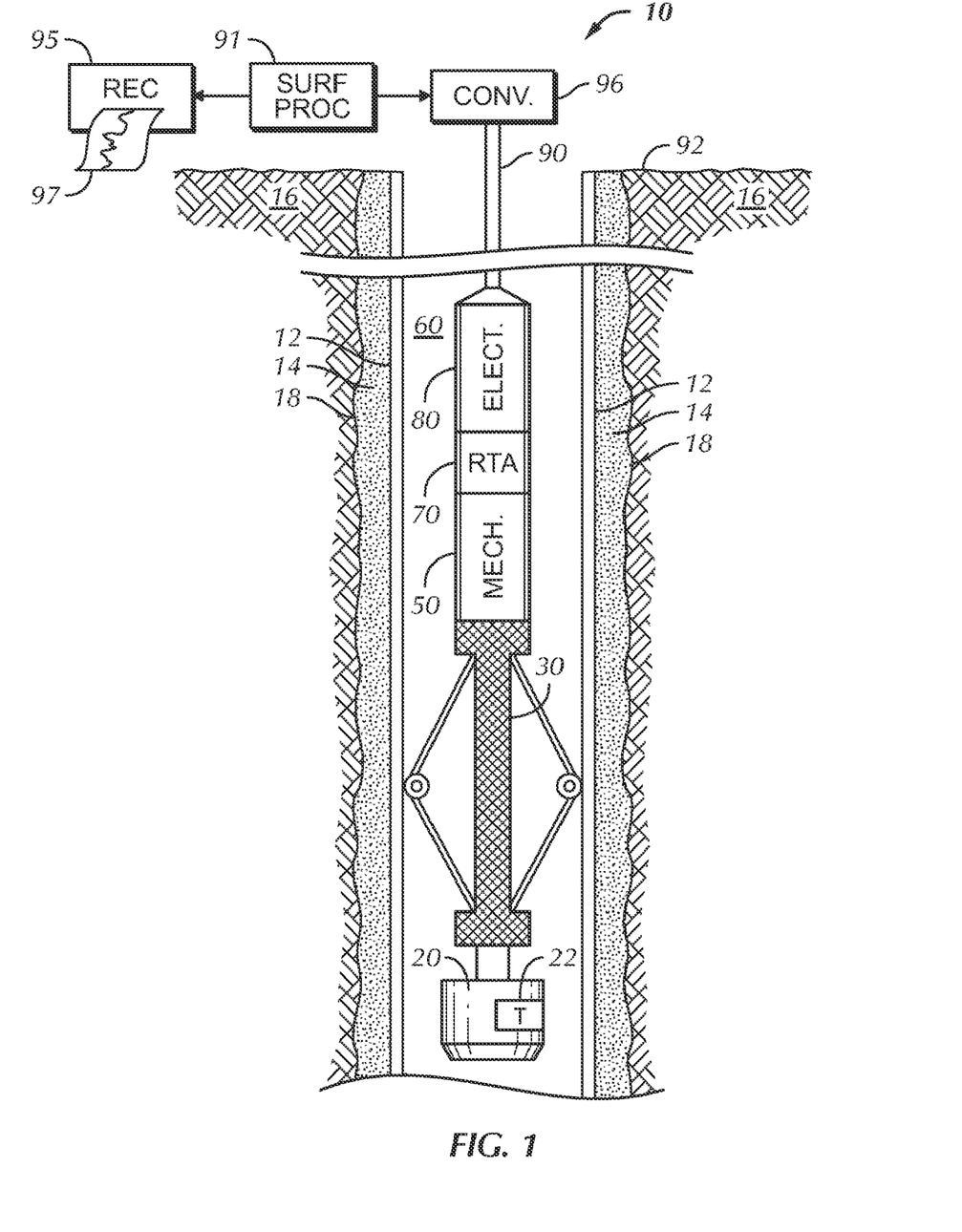
FIG. 1 illustrates the major elements of the ultrasonic cement scanner logging system operating in a well borehole environment.

FIG. 1 illustrates the major elements of the Ultrasonic Cement Scanner logging system operating in a well borehole environment. The downhole assembly or "tool", identified as a whole by the numeral 10, is suspended at a down hole end of a data conduit 90 in a well borehole defined by walls 18 and penetrating earth formation 16. The borehole is cased with a tubular casing 12, and the annulus defined by the borehole wall 18 and the outer surface of the casing 12 is filled with a grout 14 such as cement. The casing is filled with a fluid 60.

Again referring to FIG. 1, the lower end of the tool 10 is terminated by a scanning head 20 comprising an ultrasonic scanning transducer 22 of known frequency response. The scanning head is rotated about the major axis of the tool 10, and the scanning transducer 22 is activated or "fired" in sequential bursts as the scanning head 20 is rotated. The scanning transducer 22 is disposed such that emitted acoustic energy bursts are directed essentially perpendicular to the major axis of the borehole. The transducer is fired at azimuthal positions, which are preferably sequentially at equal time intervals and burst widths, about 72 times per revolution of the scanning head 20. A response signal, resulting from each emitted acoustic energy burst interacting with the borehole environs, is measured by the scanning transducer 22 and subsequently processed. Only one transducer is illustrated, but it should be understood that two or more transducers can be disposed within the scanning head 20, and responses of each scanning transducer processed to obtain parameters of interest. The scanning head 20 is easily interchanged so that the diameter of the scanning head can be selected to yield maximum response in a borehole of given diameter. Characteristics and operating properties of the preferred scanning transducer are discussed in detail in the previously referenced U.S. Patent Application Publication No. US 2006/0067162 A1.

Still referring to FIG. 1, the scanning head 20 is operationally attached to a centralizer subassembly 30, which positions the tool 10 essentially in the center of the borehole. The centralizer subassembly 30 is operationally attached to a mechanical subassembly 50 as is illustrated in FIG. 1. The mechanical sub section comprises a motor which rotates the scanning head 20, a slip ring assembly to conduct electrical signals to and from the scanning transducer 22 within the scanning head 20, and a pressure balance system that is used to maintain certain elements of the tool 10 at borehole pressure.

A reference transducer assembly 70 is disposed above the mechanical subassembly 50 as illustrated in FIG. 1. The reference transducer assembly or "mud transducer" measures the slowness and the acoustic impedance of the borehole fluid 60. The reference transducer assembly is also responsive to systematic variations in the response of the tool 10, such as transducer drift, temperature related changes in electronic components, and the like. These measurements are used to correct measured parameters of interests for changes in the scanning transducer response due to environmental or systematic operational conditions.

Again referring to FIG. 1, the upper end of the tool 10 is terminated with an electronics subassembly 80. The electronics subassembly comprises electronics for controlling the various elements of the tool 10, a control processor 86 which directs the operation of the tool, a data processor which processes full wave signals from the scanning and reference transducers to obtain one or more parameters of interest, power supplies to operate electrical elements of the tool 10, and a down hole telemetry element for transmitting data to and receiving data from the surface of the earth.

Details of the centralizer subassembly 30, the mechanical subassembly 50, the reference transducer assembly 20, and the electronics subassembly 80 are presented in previously referenced U.S. Patent Application Publication No. US 2006/0067162 A1.

The tool 10 is shown suspended within the casing 12 by the data conduit 90 that is operationally attached at an up hole end to a conveyance means 96 at the surface of the earth 92. The Ultrasonic Cement Scanner system can be embodied in a variety of configurations. As examples, if the data conduit 90 is a multi conductor wireline, the conveyance means 96 is a logging system draw works as is known in the art. If the data conduit 90 is a single conductor cable, the conveyance means 96 is again a logging system draw works but typically smaller in size. If the data conduit 90 is a coiled tubing with one or more conductors therein, then the conveyance means is a coiled tubing injector as is known in the art. A surface processor 91 is used for data processing at the surface, and is shown operationally connected to the conveyance means 96. A recording means 95 cooperates with the surface processor 91 to generate one or more "maps" or "logs" 97 of parameters of interest measured as a function depth of the tool 10 within the borehole. For purposes of further discussion, it will be assumed that the data conduit is a wireline cable comprising one or more conductors, and the conveyance means 96 is a logging system draw works comprising a motor, a winch, and tool depth measuring apparatus.

Data Acquisition and Processing

As stated previously, acoustic impedance varies as function of depth within a well more dramatically in the presence of foam cement than in the presence of fluids or homogeneous cement slurries. The nature of the variation can be explained by the strong change in acoustic impedance between the different components that make up foam cement, which include glass beads, ceramic spheres filled with air, nitrogen bubbles, and the cement itself.

The ultrasonic scanning tool measures acoustic impedance "$Z_i(x)$" as a function of azimuthal arc segment "i" around the borehole 60 and as a function of depth "x" in the borehole. More specifically, cement acoustic impedance $Z_i(x)$ of the cement behind casing, from which a map of cement distribution as a function of depth is generated, is given by the relationship $$Z_i(x)=a+(b+(c*THICK))*\ln(ARATIO(x)) \quad (1)$$

where THICK is the thickness of the casing, ARATIO(x) is a casing-cement bonding relationship, a, b and c are predetermined constants. Details of the computation of $Z_i(x)$ from quantities measured by the ultrasonic scanning tool 10 are presented in previously referenced U.S. Patent Application Publication No. US 2006/0067162 A1.

In a typical borehole cementing operation, the acoustic impedance of conventional cement is substantially greater than the well fluid preceding the cement slurry. For example, the acoustic impedance of conventional cement slurry varies between 3 and 6 Mrayls while the acoustic impedances of most other common well fluids vary from 0.4 to 2.3 Mrayls. In the absence of foam cement, an acoustic impedance measurement can distinguish between conventional cement and well fluids. The acoustic impedance of foam cement is however, within the impedance range of 0.4 to 2.3 Mrayls and therefor can not be distinguished from well fluid using only a measure of acoustic impedance.

The ultrasonic scanning tool preferably makes 72 measurements per revolution of the scanning transducer 22. Values of $Z_i(x)$ 9 i=1, 2, 3, . . . 72) for each azimuthal measurement are determined as a function of depth x, where x can represent a discrete depth or preferably a variable depth range or depth increment. From these measurements, a first or "impedance" map is generated representing impedance preferably over a fully 360 degree azimuthal sweep of the borehole as a function of the depth increment x.

A fast Fourier transform (FFT) is then applied to each of the 72 impedance traces individually over the variable increment. The equation that allows transformation of the depth series of impedance samples into frequency-domain samples or cycles/depth-units $Y_{(\omega)i}$ is given by the relationship:

$$Y_{(\omega)i} = (1/n)\sum_{i=0}^{n-1}(Z_i e^{-j\omega_i n}) \quad (2)$$

where
$Z_i$=acoustic impedance;
$Y(\omega)i$=FFT function;
n=number of depth samples
w=angular frequency in the depth domain (cycles/unit depth); and
$j=\sqrt{-1}$ The magnitude of the variation or frequency within the specified range of samples is a measure of the impedance contrasting samples and therefore the identification of the presence of foam cement. This information is used to generate a second or "FFT map" preferably over a fully 360 degree azimuthal sweep of the borehole as a function of the depth increment x.

The acoustic impedance map is then logically combined with the FFT map to generate a third or "final acoustic impedance" map with the following logic rules:

1. An impedance range defined by upper and lower limits and a FFT function threshold are defined, wherein the preferred upper and lower limits of the impedance range are 2.3 and 0.4 Mrayls, respectively.

2. If the $Z_i(x)$ value computed from equation (1) is greater than 2.3 Mrayls, then this value for $Z_i(x)$ is denoted on the first or impedance map and on the third or final impedance map as conventional homogeneous slurry cement.

3. If the $Z_i(x)$ value computed from equation (1) falls between 0.4 and 2.3 Mrayls and the corresponding FFT function $Y_{(\omega)i}$ is greater than a predetermined FFT function threshold $Y_t$ on the second or FFT map, then $Y_{(\omega)i}$ is set to a value of $Y_{(\omega)i}=-1$ and displayed on the third or final impedance map as foam cement.

4. If the $Z_i(x)$ value computed from equation (1) falls between 0.4 and 2.3 Mrayls and the FFT function $Y_{(\omega)i}$ is less than the FFT function threshold $Y_t$ on the second or FFT map, then the original value for $Z_i$ is displayed the third of final impedance map as well liquid 5. If the $Z_i(x)$ value computed from equation (1) is less than 0.4 Mrayls, then the original value of $Z_i$ is displayed on the third or final impedance map as gas.

It should be understood that information in the three maps discussed above can alternately be displayed as a plurality of log traces, where each trace represents a measurement or computed parameter in an assigned azimuthal arc segment of the borehole.

Figure 2:
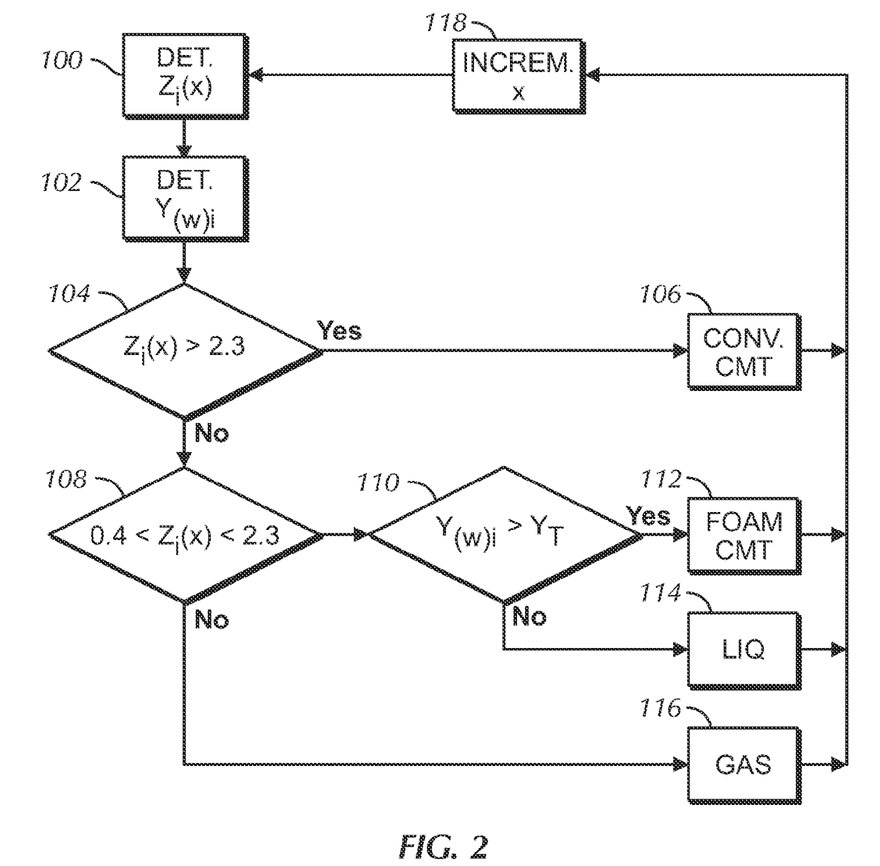
FIG. 2 illustrates a flow chart of logical rules used to generate a final impedance map.

The use of the above logic rules in generating the final impedance map is summarized in the flow chart of FIG. 2. Values of $Z_i(x)$ as defined in equation (1) are determined at 100 for a given depth increment x. Corresponding values of $Y_{(\omega)i}$ are computed using equation (2) at 102. If it is determined at 104 that $Z_i(x)$ is greater than 2.3 Mrayls, then conventional cement is displayed on the final impedance map at 106. If it is determined at 108 that $Z_i(x)$ is between 0.4 and 2.3 Mrayls and further determined at 110 that the corresponding $Y_{(\omega)i}$ is greater than a FFT function threshold $Y_t$, then foam cement is displayed on the final impedance map at 112. If it is determined at 108 that $Z_i(x)$ is between 0.4 and 2.3 Mrayls and further determined at 110 that the corresponding $Y_{(\omega)i}$ is less than a FFT function threshold $Y_t$, then liquid is displayed on the final impedance map at 114. Finally, if it is determined at 108 that $Z_i(x)$ is less than 0.4 Mrayls, gas is displayed on the final impedance map at 116.

Mathematical computations can optionally be performed in a processor within the electronics section 80 of ultrasonic scanning tool 10 (see FIG. 1) and telemetered to the surface thereby minimizing telemetry band width requirements.

Results

Examples presented below that illustrate fluid and foam cement effects on the acoustic impedance measurement and on the resulting final impedance maps.

Figure 3:
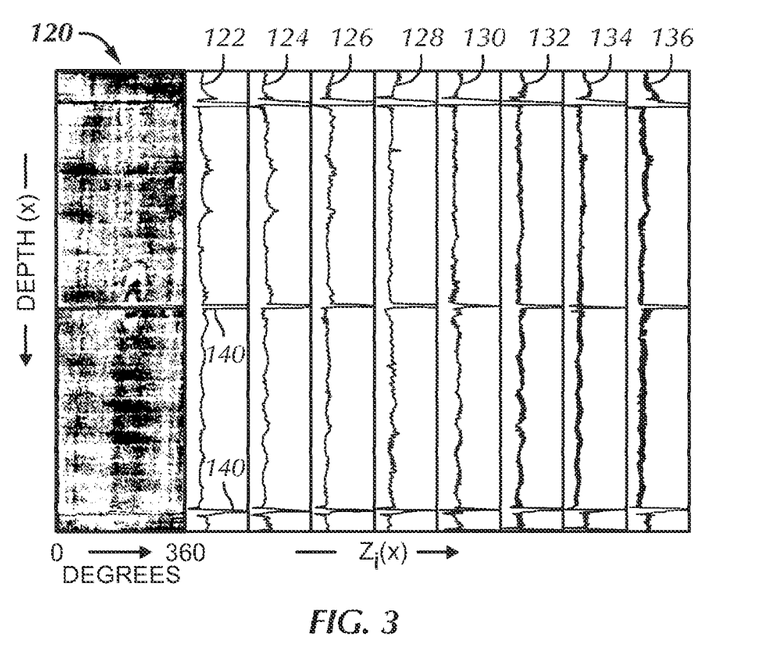
FIG. 3 is an impedance map and a group of eight related impedance logs illustrating response of the ultrasonic cement scanner logging system to a situation in which well fluid fills the casing-borehole annulus.

FIG. 3 is an impedance map and a group of eight related impedance logs illustrating response of the ultrasonic cement scanner logging system to a situation in which well fluid fills the casing-borehole annulus. Recall that the rotating transducer 22 preferably fires 72 times per azimuthal rotation within the borehole. Groups or "tracks" of curves 124, 126, 128, 130, 132, 134 and 136 comprise "traces" each represent nine logs of acoustic impedance $Z_i(x)$ computed from transducer responses in azimuthal arc segments 0-45 degrees, 46-90 degrees, 91-135 degrees, 136-180 degrees, 181-225 degrees, 226-270 degrees, 271-315 degrees, and 316-360 degrees, respectively. The vertical axis represents depth x in the borehole. Note the small variation in individual traces of $Z_i(x)$ over depth intervals of a few feet, except for excursions 140 at casing collars. Although the scales for $Z_i(x)$ in Mrayls for each track have been omitted for clarity, values of $Z_i(x)$ fall within the range of 1.4 to 1.6 Mrayls (except at the casing collars). The track to the left illustrates an acoustic impedance map 120 generated from the 72 traces of $Z_i(x)$. A gray scale indicates the magnitude of impedance at a given depth and at a given azimuthal angle, with darker shades indicating larger values of $Z_i(x)$.

Figure 4A:
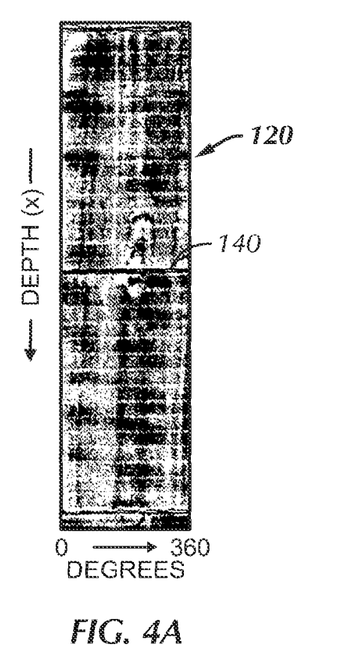
FIG. 4a is a duplicate of the acoustic impedance map shown in FIG. 3.
Figure 4B:
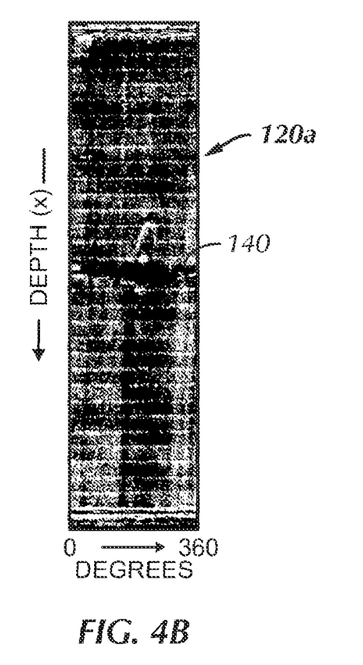

FIG. 4a is, for comparison purposed, a duplicate of the acoustic impedance map 120 shown in FIG. 3. Pixels forming the map are measures of impedance of material within the casing-borehole annulus, with one dimension being a borehole azimuthal arc segment and the second dimension being a borehole depth interval. A corresponding FFT map, not shown in this example for brevity, likewise shows little variation and further shows values of the function $Y_{(\omega)i}$ to less than a FFT function threshold $Y_t$. FIG. 4b is the corresponding final acoustic impedance map 120a obtained by combining the FFT map with the acoustic impedance map 120 using the logic rules discussed above and shown in functional flow chart form in FIG. 2. Notice that there are no discernible differences between the acoustic impedance map 120 maps except at the collar 140, which exhibits a response similar to foam cement.

Figure 5:
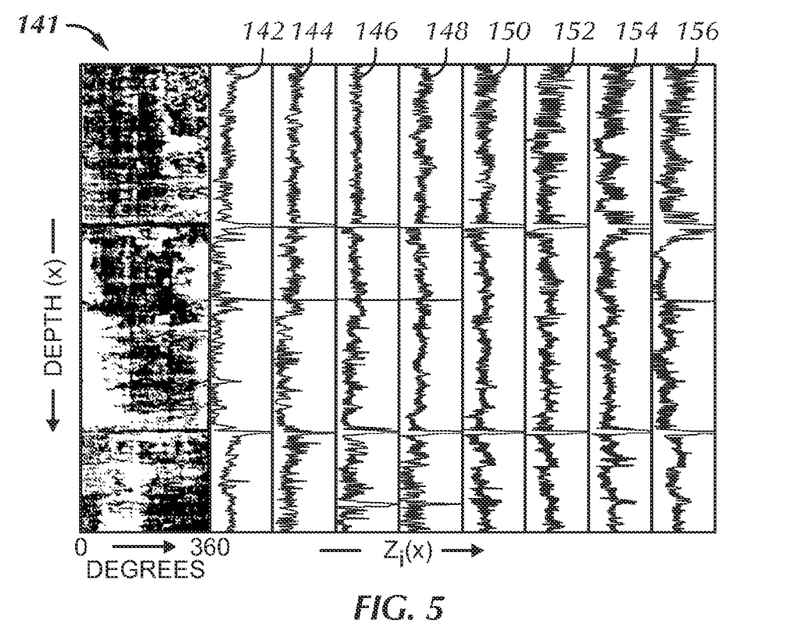
FIG. 5 shows the same parametric information as shown in FIG. 3, but at a greater depth x. within the well borehole.

FIG. 5 shows the same parametric information as shown in FIG. 3, but at a greater depth x within the well borehole. The acoustic impedance map is denoted at 141. The tracks of curves 142, 144, 146, . . . , 156 show much more activity in impedances $Z_i(x)$ computed for the previously defines azimuthal arc segments encompassing the borehole. It is noted, however, that the average values $Z_i(x)$ remain relatively low and within the range of the fluid value of 0.4 to 2.3 Mrayls.

Figure 6A:
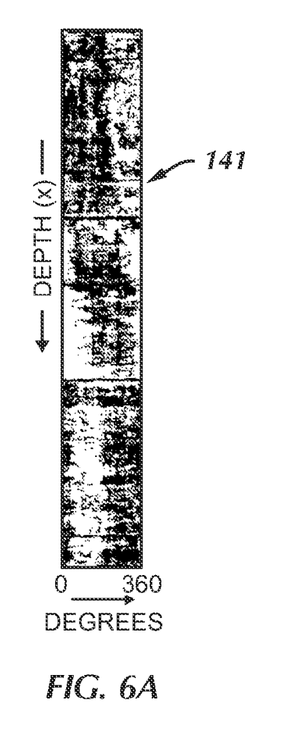
FIG. 6a is the acoustic impedance map of FIG. 5 illustrating high acoustic activity as a function of azimuth and depth.
Figure 6B:
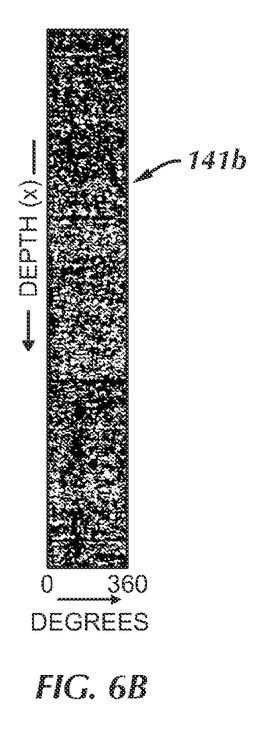

FIG. 6a is, for comparison purposes, a duplicate the acoustic impedance map 141 shown in FIG. 5. FIG. 6b is a FFT map 141b that corresponds to the impedance map 141 shown in FIG. 6a. The FFT map 141b reflects the high impedance activity shown in tracks of curves 142, 144, 146, . . . , 156 of FIG. 5. The dark areas of the map 141b represent high frequency response of the FFT function (equation (2)) while the lighter areas represent low frequency responses of the FFT function. Furthermore, some values of the function $Y_{(\omega)i}$ exceed the FFT function threshold $Y_t$.

Figure 6C:
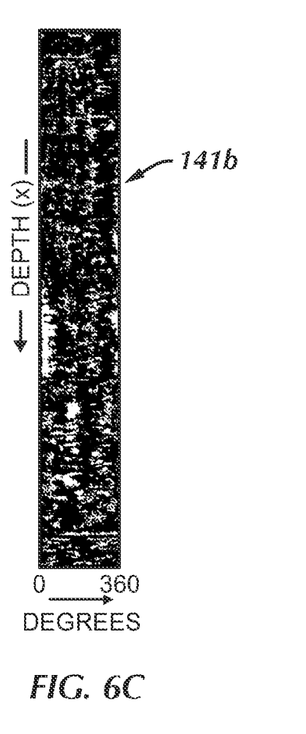
FIG. 6c is a corresponding final acoustic impedance map obtained by logically combining a FFT map with the acoustic impedance map shown in FIG. 6a and indicating the presence of foam cement.

FIG. 6c shows a final impedance map 141c obtained by combining the impedance map 141 (shown in FIG. 6a) with the corresponding FFT map 141b (shown in FIG. 6b) using the logic rules discussed above and shown in functional flow chart form in FIG. 2. Areas of the final impedance map 141c in which the foam cement criteria are met are shown in black. The essentially uniform distribution of black areas indicates that the casing-cement annulus is, in fact, filled with foam cement. The logic rules summarily state that the observed high acoustic impedance activity combined with low average acoustic impedance indicates the presence of foam cement.

Summary

The ultrasonic scanning tool measures acoustic impedance (and optionally other parameters as disclosed in previously referenced U.S. Patent Application Publication No. US 2006/0067162 A1) as a function of azimuth and of depth in a well borehole. Data processing includes the construction of a first map comprising measured impedance around a 360 degree sweep of the borehole as a function of depth. This first or acoustic impedance map distinguishes between high impedance conventional cement and well fluids such as formation and drilling fluids. A second or FFT map is constructed using results of the FFT as a function of depth and azimuth. This second map includes variations that distinguish between the borehole fluids and foam cement. A third or final acoustic impedance map is constructed by logically combining the first map and the second map using logical thresholds and values. This third map identifies and distinguishes between the presence of high impedance cement, foam cement, and well fluids.

While the foregoing disclosure is directed toward the preferred embodiments of the invention, the scope of the invention is defined by the claims, which follow.

What is claimed is:

1. A method for measuring material within a casing-borehole annulus, the method comprising:
    (a) obtaining a plurality of impedance measurements as a function of depth within said borehole;
    (b) transforming said plurality of impedance measurements into frequency-domain samples using a FFT to obtain a plurality of FFT function values wherein each said FFT function value corresponds to a said impedance measurement at a specific depth; and
    (c) at each said specific depth, combining said impedance measurement with said corresponding FFT function value using logic rules to obtain a final impedance value indicative of said material at that said specific depth.

2. The method of claim 1 wherein said logic rules comprise:
    (a) defining an impedance range and a FFT function threshold;
    (b) identifying the said material at said specific depth as conventional cement if a said impedance measurement at that depth is greater than an upper limit of said impedance range;
    (c) identifying said material at said specific depth as foam cement if
        (i) a said impedance measurement at that depth is less that said upper limit and greater than a lower limit of said impedance range, and
        (ii) said FFT function at that depth is greater than said FFT function threshold;

(d) identifying said material at said specific depth as liquid if
  (i) a said impedance measurement at that depth is less that said upper limit and greater than said lower limit of said impedance range, and
  (ii) said FFT function at that depth is less than said FFT function threshold; and
(e) identifying the said material at said specific depth as gas if a said impedance measurement at that depth is less than said lower limit of said impedance range.

3. The method of claim 2 wherein said upper limit of said impedance range is 2.3 Mrayls and said lower limit is 0.4 Mrayls.

4. A method for generating a map indicative of material within a casing-borehole annulus, the method comprising;
(a) obtaining, within a plurality of borehole azimuthal arc segments, a plurality of impedance measurements as a function of depth within said borehole;
(b) for each said azimuthal arc segment, transforming said plurality of impedance measurements into frequency-domain samples using a FFT to obtain a plurality of FFT function values wherein each said FFT function value corresponds to a said impedance measurement at a specific depth;
(c) within each said azimuthal arc segment and at each said specific depth, combining said impedance measurement with said corresponding FFT function value using logic rules to obtain a final impedance value indicative of said material within that said specific arc segment and at that said specific depth; and
(d) displaying said impedance values as a function of depth and arc segment in which determined thereby generating said map.

5. The method of claim 4 wherein said logic rules comprise:
(a) defining an impedance range and a FFT function threshold;
(b) identifying the said material at said specific depth and said specific arc segment as conventional cement if a said impedance measurement is greater than an upper limit of said impedance range;
(c) identifying said material at said specific depth and said specific arc segment as foam cement if
  (i) a said impedance measurement is less that said upper limit and greater than a lower limit of said impedance range, and
  (ii) said FFT function is greater than said FFT function threshold;
(d) identifying said material at said specific depth and said specific arc segment as liquid if
  (i) a said impedance measurement is less that said upper limit and greater than said lower limit of said impedance range, and
  (ii) said FFT function is less than said FFT function threshold; and
(e) identifying the said material at said specific depth and said specific arc segment as gas if a said impedance measurement is less than said lower limit of said impedance range.

6. The method of claim 5 wherein said upper limit of said impedance range is 2.3 Mrayls and said lower limit is 0.4 Mrayls.

7. The method of claim 6 wherein the number of said arc segments is 72.

8. The method of claim 6 wherein said plurality of arc segments encompasses a 360 degree sweep of said borehole.

9. Apparatus for measuring material within a casing-borehole annulus, the apparatus comprising:
(a) a scanning head that rotates a scanning transducer assembly radially within a borehole;
(b) a mechanical subassembly for rotating said scanning head;
(c) a processor for recording and processing acoustic responses of said scanning transducer to obtain a plurality of impedance measurements within at least one azimuthal arc segment as a function of depth within said borehole;
(d) a relationship for transforming said plurality of impedance measurements into frequency-domain samples using a FFT to obtain a plurality of FFT function values wherein each said FFT function value corresponds to a said impedance measurement within said at least one azimuthal arc and at a specific depth; and
(f) logic rules for combining, at said at least one azimuthal arc segment and at said specific depth, said impedance measurement with said corresponding FFT function value using logic rules to obtain a final impedance value indicative of said material within that at least one azimuthal arc segment and at that said specific depth.

10. The apparatus of claim 9 wherein said logic rules comprise:
(a) defining an impedance range and a FFT function threshold;
(b) identifying the said material at said specific depth and within said at least one azimuthal arc segment as conventional cement if a said impedance measurement is greater than an upper limit of said impedance range;
(c) identifying said material at said specific depth and within said at least one azimuthal arc segment as foam cement if
  (i) a said impedance measurement is less that said upper limit and greater than a lower limit of said impedance range, and
  (ii) said FFT function is greater than said FFT function threshold;
(d) identifying said material at said specific depth and within said at least one azimuthal arc segment as liquid if
  (i) a said impedance measurement is less that said upper limit and greater than said lower limit of said impedance range, and
  (ii) said FFT function is less than said FFT function threshold; and
(e) identifying the said material at said specific depth and within said at least one azimuthal arc segment as gas if a said impedance measurement is less than said lower limit of said impedance range.

11. The apparatus of claim 10 wherein
(a) a plurality of impedance measurements is made within a plurality of said borehole azimuthal arc segments at that depth;
(b) said plurality of impedance measurements are transformed into frequency-domain samples using a FFT to obtain a plurality of FFT function values wherein each said FFT function value corresponds to a said impedance measurement at a specific depth and within a specific azimuthal arc segment;
(c) said plurality of impedance measurements are combined with said corresponding FFT function values using said logic rules to obtain a final impedance value indicative of said material within that specific arc segment and at that said specific depth; and (d) said final impedance values are displayed as a function of depth and azimuthal arc segment in which determined thereby generating said map indicative of said material.

12. The apparatus of claim 10 wherein said upper limit of said impedance range is 2.3 Mrayls and said lower limit is 0.4 Mrayls.

13. The apparatus of claim 11 wherein the number of said arc segments is 72.

14. The apparatus of claim 11 wherein said plurality of arc segments encompasses a 360 degree sweep of said borehole.

15. The apparatus of claim 9 wherein said apparatus is conveyed along said borehole with a wireline.

* * * * *